United States Patent
Tommasini

(10) Patent No.: US 6,915,794 B2
(45) Date of Patent: Jul. 12, 2005

(54) DIAMOND WIRE EQUIPPED WITH IMPROVED CUTTING BUSHES FOR CUTTING STONE MATERIAL

(75) Inventor: Giuseppe Tommasini, Cantiano (IT)

(73) Assignee: Diasint Italy S.r.l., Desio (IT)

( * ) Notice: Subject to any disclaimer, the term of this patent is extended or adjusted under 35 U.S.C. 154(b) by 301 days.

(21) Appl. No.: 10/312,950

(22) PCT Filed: May 22, 2001

(86) PCT No.: PCT/IT01/00256

§ 371 (c)(1),
(2), (4) Date: Jan. 2, 2003

(87) PCT Pub. No.: WO02/04160

PCT Pub. Date: Jan. 17, 2002

(65) Prior Publication Data

US 2003/0140915 A1 Jul. 31, 2003

(30) Foreign Application Priority Data

Jul. 6, 2000 (IT) .................................... TO2000A0681

(51) Int. Cl.[7] ................................................ B28D 1/02
(52) U.S. Cl. ............................. 125/12; 125/1; 125/21; 125/22; 125/30; 451/177; 451/178
(58) Field of Search ............................... 125/1, 12, 21, 125/22, 30; 451/177, 178

(56) References Cited

U.S. PATENT DOCUMENTS

| | | | | |
|---|---|---|---|---|
| 2,679,839 A | * | 6/1954 | Metzger | .................... 125/21 |
| 3,598,101 A | | 8/1971 | Hensley | |
| 3,847,569 A | * | 11/1974 | Snow | .................... 51/309 |
| 4,097,246 A | | 6/1978 | Olson | |

FOREIGN PATENT DOCUMENTS

| | | |
|---|---|---|
| DE | 195 16 999 | 11/1996 |
| EP | 0 213 434 | 3/1987 |
| EP | 0 414 280 | 2/1991 |
| GB | 723 197 | 2/1955 |
| JP | 01 159166 | 6/1989 |

* cited by examiner

Primary Examiner—Joseph J. Hail, III
Assistant Examiner—Shantese McDonald
(74) Attorney, Agent, or Firm—Oblon, Spivak, McClelland, Maier & Neustadt, P.C.

(57) ABSTRACT

A diamond wire (1) is disclosed for cutting stone material comprising a support cable (2) with around it a plurality of cutting bushes (3) and a plurality of elastic means (5). The cuttting bushes (3) comprise: an hollow cylindric support (10); at least one diamond cutting sector (12) connected to an external surface of the support (10); and at least one non-diamond support/cutting sector (14) connected to the external surface of the support (10) and laterally connected to the cutting sector (12).

19 Claims, 1 Drawing Sheet

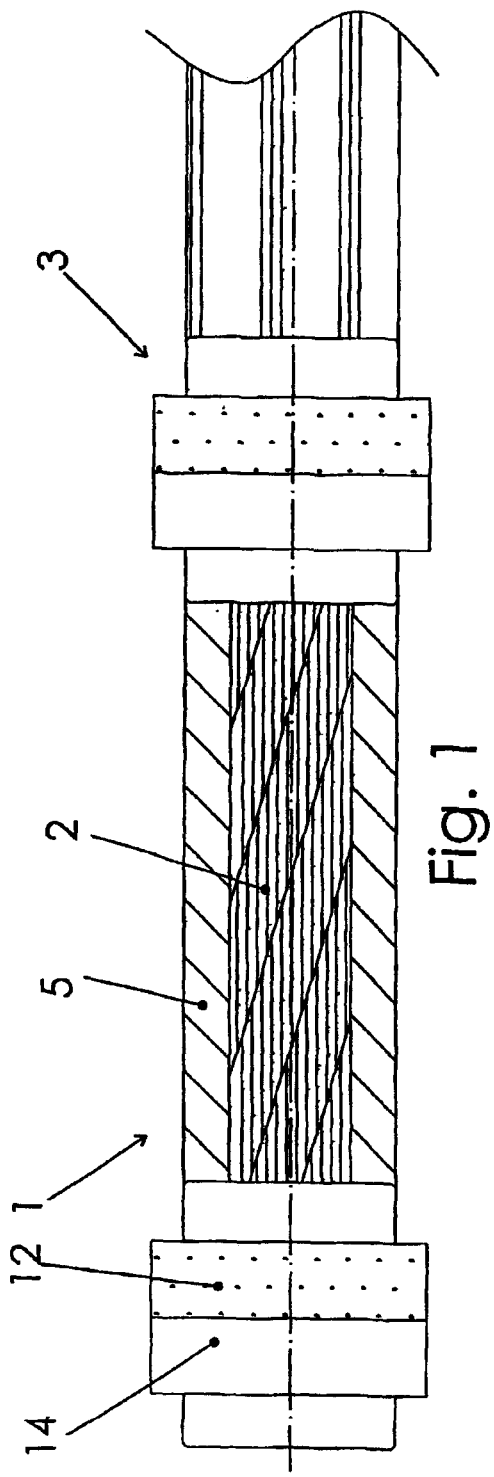
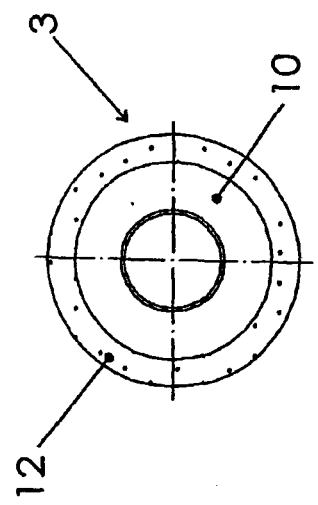
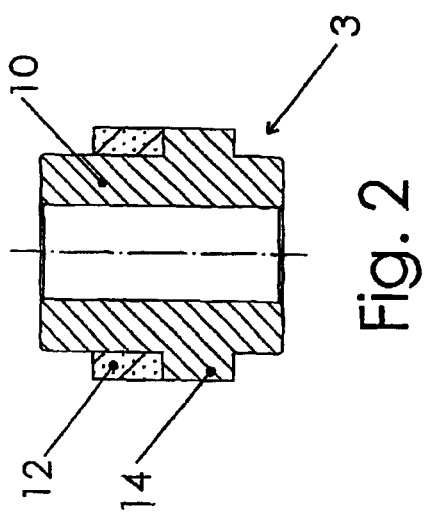

DIAMOND WIRE EQUIPPED WITH IMPROVED CUTTING BUSHES FOR CUTTING STONE MATERIAL

The present invention refers to a diamond wire equipped with improved cutting bushes for cutting stone material.

Diamond wires are known in the art for cutting stone materials, such wires using a plurality of cutting sectors made of diamond powders, mutually interconnected by elastic means such as springs or rubber bushes.

These diamond wires are costly, and the majority of their price is composed of the diamond cutting sectors themselves. Due to this very reason, such wires also have the problem of their repair and their new linings, since they, after a certain period of work, are sent back to the manufacturer so that he can restore the worn parts, because their high cost does not allow to discard them at least until when they are completely unusable. This obviously brings about a further waste of costs and times, both for the manufacturer and for the end user.

U.S. Pat. No. 4,097,246 discloses a method of making an abrasive wire for sawing stone having a set of support members for respective cutting members.

GB-A-723 197 discloses a stone-cutting cable saw having a set of single support members for respective cutting members.

U.S. Pat. No. 3,598,101 discloses a wire saw similar to the one disclosed in GB-A-723 197.

EP-A-0 213 434 discloses a diamond pin with a plurality of support members for cutting members.

Patent Abstracts of Japan, vol. 013, no. 420 discloses a cutting device of diamond wire saw with a set of cylindrical cutting members surrounding respective cylindrical support members.

DE-A-195 16 999 discloses a diamond saw with an elongated support for cutting members.

Object of the present invention is solving the above prior-art problems, by providing a diamond wire equipped with improved cutting bushes whose cost is very low with respect to the original bushes and that guarantee a very satisfactory cutting efficiency.

A further object of the present invention is providing a diamond wire that does without the problem of repairs and new linings, since this wire is of such a low cost that it can be discarded after it worns out and can be replaced by a quite new one with a lower cost than the cost of previous repair operations and the like.

The above and other objects and advantages of the invention, as will appear from the following description, are obtained by a cutting bush and a diamond wire containing such bush as claimed, respectively, in claims 1 and 11. Preferred embodiments and non-trivial variations of the present invention are claimed in the dependent claims.

The present invention will be better described by some preferred embodiments thereof, given as a non-limiting example, with reference to the enclosed drawings, in which:

FIG. 1 is a side partially-sectioned view of an embodiment of the diamond wire according to the present invention;

FIG. 2 is a side sectional view of an embodiment of a cutting bush according to the present invention; and FIG. 3 is a top view of the bush in FIG. 2.

With reference to the Figures, an illustrative and non-limiting embodiment of the diamond wire 1 and of the cutting bush 3 of the present invention is disclosed.

As regards the diamond wire 1 for cutting stone material of the invention, partially shown in FIG. 1, it substantially comprises a support cable 2 (preferably made of steel) that is inserted inside a plurality of cutting bushes 3 of an improved type, that will be described in detail below.

Function of the cable 2 is supporting and holding the bushes 3 for the following cutting operations. For this purpose, the diamond wire 1 also provides a plurality of elastic means 5 that interconnect one of the cutting bushes 3 to the next cutting bush 3: the elastic means 5 are also placed around the support cable 2 and are preferably realised as small pipes of plastic/rubber or springs, to make the work of the bushes 3 easier when cutting. Other preferred embodiments of the elastic means 5 are composed of small pipes made of plastic/rubber inside which springs are inserted.

As regards in particular the cutting bush 3 of the invention to be applied on a diamond wire 1, it comprises:

an hollow cylindric support 10 adapted to house the support cable 2 of the diamond wire 1;

at least one diamond cutting sector 12 connected to the external surface of the support 10 through a process that will be described below; and at least one non-diamond support/cutting sector 14 connected to the external surface of the support 10 and laterally connected to the cutting sector 12.

The connection of the support/cutting sector 14 to the support 10 can occur through known means, or the sector 14 and the support 10 can be realised in a single body of the same material, for example metal, and in particular steel. The support/cutting sector 14 could also be realised in an harder material than the material of the support 10, such as for example sintered tungsten carbide, or a sintered ceramic material and not only a metallic material.

The arrangement shown in FIG. 2 is the preferred and most used one, in which the bush 3 is equipped in a sequence with a diamond cutting sector 12 and a non-diamond support/cutting sector 14, that both cooperate for cutting the stone material. Moreover, the support/cutting sector 14 also performs the function of supporting the cutting sector 12 itself, due to the surface in which they are in mutual contact.

Other arrangements of the bush 3 are obviously possible according to applications, such as for example the one in which the bush 3 is equipped in a sequence with a diamond cutting sector 12, with a non-diamond support/cutting sector 14 and with a diamond cutting sector 12, or other equivalent arrangements.

With the cutting bush 3 as shown above, a ratio is realised between the working cutting length of the cutting sectors 12 and the working cutting length of the support/cutting sectors 14 that ranges between 99:1 and 20:80, and preferably between 70:30 and 30:70, and most preferably is equal to 50:50.

While in the main embodiment of the bush 3 the diameter of the sectors 12 along the cutting direction is equal to the diameter of the sectors 14, according to another possible embodiment, the diameter of the cutting sectors 12 is instead greater than the diameter of the support/cutting sectors 14, so that the cutting sectors 12 project for a small distance along the cutting direction of the diamond wire 1, in order to allow an operating easiness when cutting is started, providing a sort of starting element therefor.

As regards the results that can be obtained with the present invention, it has been found that, as pertains the cutting efficiency, the frequency of the bushes 3 placed on the wire 1 is more meaningful than their length. It has in fact been proven that a diamond wire at 40 pearls/m has a 100% efficiency, while the same wire at 37 pearls/m, with therefore a 7.5% reduction of its diamond part, is able to reach a 70% efficiency with a value that is lower by 30% only. It has therefore been thought to increase the frequency of pearls and to decrease the diamond part. The obtained results confirmed the starting hypothesis. A wire with 24 pearls/m has also been tested with bushes that were 9 mm long (corresponding for the diamond part to a wire with 37 pearls/m with bushes of a length equal to 6 mm) that had an efficiency that was by 25% lower than a wire with 30 pearls/m with bushes with a length of 6 mm.

As regards the process for realising the cutting bush 3, it comprises the creation of the cylindric cutting sector 12 using diamond powders that are sintered and simultaneously welded and linked to the support 10; then a brazing step is possibly performed to improve the link with the support/cutting sector 14. An improved cutting bush 3 is thereby realised with a very low cost with respect to the previously-known bushes, since the costly cutting sector 12 is much smaller than the previous ones, anyway keeping a very satisfactory cutting capability.

What is claimed is:

1. Cutting bush for a diamond wire for cutting stone material, comprising:
    a hollow cylindric support configured to house a support cable of said diamond wire;
    at least one diamond cutting sector connected to an external surface of said support; and
    at least one non-diamond support sector connected to the external surface of said support and laterally connected to said at least one cutting sector;
    wherein said at least one non-diamond support sector is connected to said at least one cutting sector to also perform a cutting of stone material, said non-diamond support sector operating as a non-diamond support/cutting sector, and wherein a material of which said at least one support/cutting sector is composed is harder than a material of which said support is composed.

2. The cutting bush according to claim 1, wherein said at least one support/cutting sector is made of a sintered ceramic material.

3. The cutting bush according to claim 1, wherein said at least one support/cutting sector is made of sintered tungsten carbide.

4. The cutting bush according to claim 1, further comprising:
    a second diamond cutting sector and a second non-diamond support/cutting sector disposed on the external surface of the support a sequence with the at least one diamond cutting sector and the at least one non-diamond support/cutting sector.

5. The cutting bush according to claim 1, further comprising:
    another diamond cutting sector in a sequence with the at least one diamond cutting sector, and the at least one non-diamond support/cutting sector.

6. The cutting bush according to claim 1, wherein said cutting sectors are made of diamond powders.

7. The cutting bush according to claim 1, wherein a ratio between a working length of the cutting sectors, and a working length of the support/cutting sectors ranges between 99:1 and 20:80.

8. The cutting bush according to claim 7, wherein the ratio between the working length of the cutting sectors and the working length of the support/cutting sectors ranges between 70:30 and 30:70.

9. The cutting bush according to claim 8, wherein the ratio between the working length of the cutting sectors and the working length of the support/cutting sectors is equal to 50:50.

10. The bush according to claim 1, wherein the hollow cylindric support and the at least one-non-diamond support sector are a single body of the same material.

11. The bush according to claim 1, wherein a diameter of said cutting sectors is equal to a diameter of said support/cutting sectors.

12. The bush according to claim 1, wherein the at least one diamond cutting sector is made of a sintered diamond powder.

13. The bush according to claim 12, wherein the at least one diamond cutting sector is simultaneous welded and linked to the hollow cylindric support.

14. The bush according to claim 13, wherein the at least one non-diamond support sector is brazed.

15. The cutting bush according to claim 1, wherein a diameter of said cutting sectors is greater than a diameter of said support/cutting sectors, said cutting sectors projecting along a cutting direction for a greater extent than said support/cutting sectors.

16. A diamond wire for cutting stone material, comprising:
    a support cable;
    a plurality of cutting bushes according to claim 1, said support cable being inserted inside said cutting bushes for supporting said cutting brushes; and
    a plurality of elastic means that interconnect one of said cutting bushes to a next cutting bush, said elastic means being placed around said support cable.

17. The diamond wire according to claim 16, wherein said elastic means include small pipes made of plastic/rubber.

18. The diamond wire according to claim 16, wherein said elastic means include springs.

19. The diamond wire according to claim 16, wherein said elastic means include small pipes made of plastic/rubber inside which springs are inserted.

\* \* \* \* \*